No. 865,312. PATENTED SEPT. 3, 1907.
C. H. MOORE.
WASTE WATER TRAP.
APPLICATION FILED AUG. 8, 1905.

Witnesses
A. R. Appleman
John Burkhardt

Inventor
C. H. Moore

UNITED STATES PATENT OFFICE.

CHARLES H. MOORE, OF NEW YORK, N. Y.

WASTE-WATER TRAP.

No. 865,312.  Specification of Letters Patent.  Patented Sept. 3, 1907.

Application filed August 8, 1905. Serial No. 273,233.

*To all whom it may concern:*

Be it known that I, CHARLES H. MOORE, a citizen of the United States, residing at New York city, in the borough of Manhattan, in the county of New York and State of New York, have invented a new and useful Improvement in Waste-Water Traps, of which the following is a specification.

The object of this invention is to produce a leaden trap with the inlet and outlet ends prepared so that a connection with a threaded waste pipe and with a wash-basin or bath-tub can be made without having to make a soldered joint at either end of the trap in the building when installing the fixtures.

Another object of this invention is to provide a hard surfaced smooth finished waste water trap that will have some flexibility so that it can be bent sufficient to meet certain discrepencies that arise in the installation of waste pipes and lavatory fixtures.

It is also my object to make the trap with a double curved adjustable flexible inlet end or movable member arranged so that it can be turned horizontally either to the right or left or at any angle without altering the position of the water retaining section of the trap.

Figure 5:
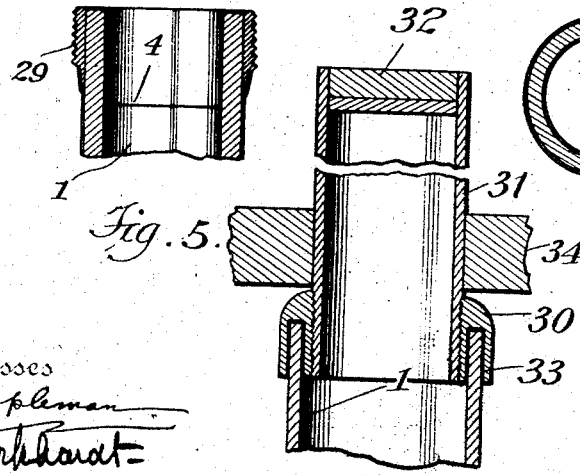

In placing waste pipes, it frequently happens that the thread in the fitting to which the lavatory or sink-trap is to be screwed is a trifle out from the horizontal line, and this difference, when a brass or stiff metal trap is screwed in place throws the inlet leg of the trap considerably off the perpendicular, and often causes more or less troublesome fitting to get the coupling on the trap to meet the corresponding coupling of the fixture that the trap is to connect to, especially in traps for bath tubs where an adjustable offset fitting cannot be used at the inlet. To overcome this difficulty in setting a bath-tub, I make the trap of lead and put a threaded stiff metal fitting on the discharge pipe, and a threaded stiff metal fitting on the inlet end, and after the trap is screwed in, the inlet leg of it can be set plumb and then lengthened as shown in Fig. 5.

For lavatory fixtures, on exposed work, I cover the outer surface of the trap with a thick enough layer of stiff metal to give it a hard smooth finish that will not scratch readily and that can be nickel or silver plated, but not so thick but what the inlet leg of the trap can be bent at the U shaped curve sufficient to meet the requirement.

Figure 1:
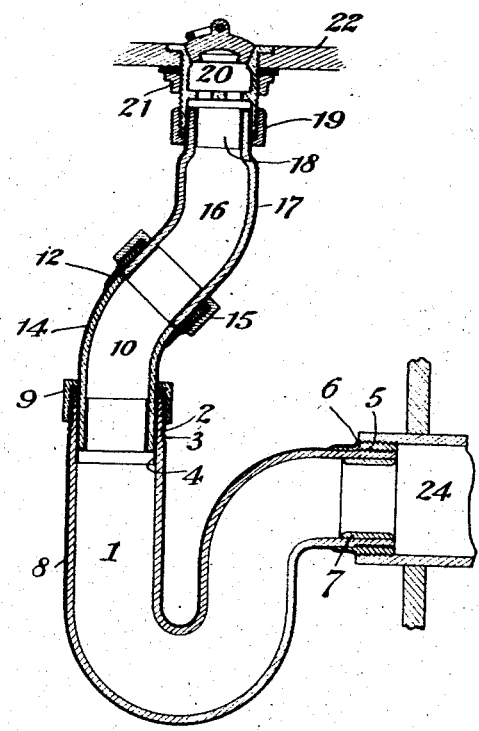
Figure 2:
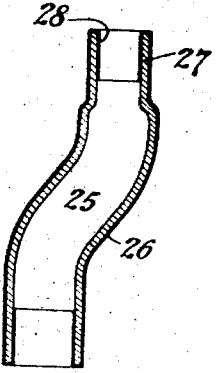
Figure 4:
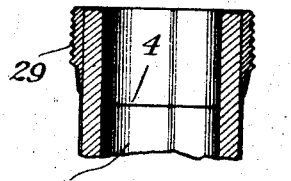
Figure 3:
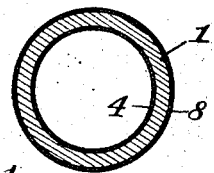

In the accompanying drawings forming a part of this specification Figure 1 is a central vertical section of the invention. The discharge end may represent either a wash-basin or bath-tub trap. Fig. 2 represents a central vertical section of the double curved inlet fitting made in one piece. Fig. 3 shows a transverse section of the trap at either end. Fig. 4 represents the inlet or outlet end of the trap with a threaded ferrule secured over the outside of it. Fig. 5 shows the inlet end of the trap as it may be prepared for use in connection with a bath-tub.

1 represents a leaden trap having a thread 2 cut on the inlet end and a shell 3 of stiffer metal than the trap put on the leaden V shaped threads to stiffen the said threads and protect the points from injury. I also put a thin stiff metal lining 4 in the inlet end to reinforce it so that the lead will not work loose from the shell 3 by expansion and contraction, and to stiffen it so that the weight of the trap will not affect the threads when the trap is installed, or a threaded stiff metal ferrule 29 may be secured on the inlet or outlet ends of the trap or both, in which case the stiff metal covering 8 may extend from the leaden trap over the joint between the threaded ferrule and the lead, thereby strengthening the said joint and giving the trap the appearance of one continuous piece as shown by Fig. 4.

5 shows a thread on the discharge end of the trap; 6 is a threaded ferrule of stiff metal screwed on the V shaped threads and 7 is a stiff metal reinforcement within the discharge end.

8 shows a stiff metal covering all over the outside surface of the trap and is thick enough to harden the surface sufficient to prevent its getting easily dented or scratched.

9 is a coupling nut on the inlet end of the trap.

10 is a curved leaden fitting that forms the lower section of the double curved adjustable movable member, and 12 is a threaded fitting over the inlet end and permanently secured thereon, or a thread can be cut on the lead inlet end, and a thin shell of stiff metal put on it the same as on the inlet of the leaden trap. 14 represents a stiff metal covering on the outside surface of the bend; 15 represents a nut to connect the two curved members together, 16 is a curved leaden fitting that forms the upper section of the double curved adjustable movable member. 17 is a hard metal covering on the outside surface, and 18 is a reduced neck of the said fitting. These curved fittings 10 and 16 may be made of brass or other stiff metal, so I do not wish to be confined to the use of lead for this particular feature of the invention.

19 is a coupling nut to complete the connection between the trap and basin, 20 is the basin coupling and 21 is a lock nut to fasten the coupling 20 to the basin 22.

24 shows a waste pipe to which the trap is screwed.

25 shows the double curved movable member made in one piece of lead or any suitable softer metal than brass. And having a thin hard metal covering 26 and a reduced upper end 27 that can either be formed in the lead or be a separate piece soldered or otherwise connected to the lead, 28 is a reinforcement within the end of the curved fitting 25.

When the trap is used in connection with a bath-tub, it is placed under the floor 34 as shown in Fig. 5 and a pipe 31 that is to connect with the bath-tub fixture is screwed to a fitting 30 that is soldered or otherwise secured to the inlet end of the trap, and has the upper end closed and soldered as indicated by numeral 32, to prepare for testing the waste pipe as may be required by a city ordinance.

If it is desirable the trap can have a straight adjustable inlet connection instead of the curved members.

What I claim as new and desire to secure by Letters Patent, is,

1. A leaden or soft metal waste water trap, having a thread cut on the outside of the inlet end, a quantity of harder metal than lead and of sufficient thickness to stiffen the thread and the inner wall of the inlet end, put on the said thread and inlet end, a nut screwed on the inlet end, a tube to connect the trap with a wash-basin, sink, or bath-tub, and the necessary coupling nuts to complete the connection substantially as described.

2. A leaden or soft metal waste water trap having a thread cut on the outside of the inlet end, a quantity of harder metal than the trap and of sufficient thickness to stiffen the thread, put on the said thread, a nut screwed thereon, a tube to connect the trap with a wash-basin, sink, or bath-tub, and the necessary coupling nuts to complete the connection substantially as described.

3. A leaden or soft metal waste water trap having a threaded fitting of stiffer material than the trap secured to the discharge end, by which the trap is secured to the waste pipe, a threaded fitting of stiffer material than the trap secured to the inlet end, and to be placed under the floor, and a pipe 31 screwed to the last named fitting under the floor, and extending through the floor far enough to be cut off to connect with a bath-tub fixture and having the upper end closed for testing purposes.

4. A leaden or soft metal waste water trap having a thread cut on the outside of the inlet end, a quantity of harder metal than the trap and of sufficient thickness to stiffen the thread, put on the said thread, a nut screwed thereon, a tube to connect the trap with a wash-basin or sink, the necessary coupling nuts to complete the connection between the inlet end of the trap and the basin coupling, and a metal fitting secured to the discharge end of the trap and arranged to be connected to an iron or brass waste pipe.

5. A leaden or soft metal waste water trap having a thread cut on the inlet end, a quantity of harder metal than the trap and of sufficient thickness to stiffen the threads, on the said threads and outside surface of the trap, a tube to connect the trap with a wash-basin or sink and the necessary coupling nuts to complete the connection substantially as described.

6. A leaden or soft metal waste water trap having a reinforcing socket and guide of stiffer material than the trap fitted closely to the wall of the inlet end and secured thereto, a thread cut on the end of the reinforcing socket, a quantity of harder metal than the trap and of the thickness of thin sheet brass, put on the outer surface of the trap and the lower end of the reinforcing socket, a nut screwed on the said socket, a tube to make the connection between the basin coupling and trap, and the necessary nuts to complete the connection, substantially as described.

7. A leaden or soft metal waste water trap reinforced within the inlet end by a lining of stiffer material than the trap permanently secured therein, a threaded ferrule or ring of stiffer material than the trap secured on the outside and below the top edge of the inlet end, a nut screwed thereon, a tube whereby the trap is lengthened vertically, and the necessary coupling nuts to complete the connection with a basin or sink.

8. A leaden or soft metal waste water trap reinforced within the inlet and outlet ends by a lining of stiffer material than the trap and permanently secured therein, a threaded ferrule or ring of stiffer material than the trap secured on the outer surface of the inlet and outlet ends, a nut screwed on the inlet end, a tube whereby the trap can be lengthened vertically and the necessary coupling nuts to complete the connection with a basin or sink.

9. A leaden or soft metal waste water trap reinforced within the inlet end by a lining of metal to act as a guide for the inlet tube of the trap, a threaded ferrule or ring of stiffer material than the trap secured permanently on the outside of the inlet end, a nut screwed thereon, a threaded ferrule or ring of stiffer material than the trap secured on the outside of the discharge end and arranged to be connected to an iron or brass waste pipe, in combination with fittings on the inlet end of the trap to complete the connection with a basin or sink.

CHARLES H. MOORE.

Witnesses:
C. L. MOORE,
GRIFFITH DE NOYELLES.